United States Patent
Gupta et al.

(10) Patent No.: US 9,423,963 B2
(45) Date of Patent: *Aug. 23, 2016

(54) GENERALIZED STORAGE ALLOCATION FOR MULTIPLE ARCHITECTURES

(71) Applicant: INTERNATIONAL BUSINESS MACHINES CORPORATION, Armonk, NY (US)

(72) Inventors: Karan Gupta, San Jose, CA (US); Roger L. Haskin, Port Ludlow, WA (US); Himabindu Pucha, San Jose, CA (US); Prasenjit Sarkar, San Jose, CA (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/743,873

(22) Filed: Jun. 18, 2015

(65) Prior Publication Data

US 2015/0286415 A1    Oct. 8, 2015

Related U.S. Application Data (63) Continuation of application No. 13/664,569, filed on Oct. 31, 2012, now Pat. No. 9,122,398.

(51) Int. Cl.
*G06F 3/06* (2006.01)

(52) U.S. Cl.
CPC .............. *G06F 3/0607* (2013.01); *G06F 3/067* (2013.01); *G06F 3/0608* (2013.01); *G06F 3/0631* (2013.01); *G06F 3/0665* (2013.01); *G06F 3/0689* (2013.01); *G06F 3/0655* (2013.01)

(58) Field of Classification Search
CPC ... G06F 3/0608; G06F 3/0607; G06F 3/0631; G06F 3/0655; G06F 3/067; G06F 3/0689
USPC ................................................... 711/170, 114
See application file for complete search history.

(56) References Cited

U.S. PATENT DOCUMENTS

| | | |
|---|---|---|
| 6,922,688 B1 | 7/2005 | Frey, Jr. |
| 7,424,574 B1 | 9/2008 | Ahrens et al. |

(Continued)

FOREIGN PATENT DOCUMENTS

WO    2011128257 A1    10/2011

OTHER PUBLICATIONS

Mell. P.M.. et al., "The NIST Definition of Cloud Computing", National Institute of Standards and Technology. Sep. 28, 2011. 7 pages, NIST Special Publication 800-145, Maryland, USA.

(Continued)

*Primary Examiner* — Reginald Bragdon
*Assistant Examiner* — Paul Knight
(74) *Attorney, Agent, or Firm* — Sherman IP LLP; Kenneth L. Sherman; Steven Laut (57) ABSTRACT

Embodiments of the invention relate to storage allocation in a storage system. One embodiment includes adaptively determining, by a storage device processor, a region height across disk spaces of a group of storage devices that is proportional to a number of connected storage devices. The storage device processor adaptively determines a region width across the disk spaces for the group of storage devices that is inversely proportional to a number of nodes sharing a particular storage device.

20 Claims, 6 Drawing Sheets

(56) References Cited

U.S. PATENT DOCUMENTS

| | | | |
|---|---|---|---|
| 7,894,372 B2 | 2/2011 | Chu et al. | |
| 8,041,685 B2 | 10/2011 | Ito et al. | |
| 2005/0091572 A1 | 4/2005 | Gavrilescu et al. | |
| 2006/0242283 A1 | 10/2006 | Shaik et al. | |
| 2007/0276788 A1* | 11/2007 | Cohen | G06F 17/30498 |
| 2008/0126547 A1* | 5/2008 | Waldspurger | G06F 9/4881 709/226 |
| 2009/0235041 A1 | 9/2009 | Harris | |
| 2011/0258378 A1 | 10/2011 | Ananthanarayanan et al. | |
| 2012/0144002 A1* | 6/2012 | Naganuma | G06F 3/0605 709/220 |

OTHER PUBLICATIONS

Misuraca, C.M., "Contiguous File Allocation Algorithm for the File Allocation System", IBM Technical Disclosure Bulletin. Apr. 1, 1995, pp. 133-134, vol. 38, No. 4, IBM, USA.

IBM, "Method to Accomplish Automatic Storage Allocation for a Clustered Server Application with Multiple Instances", Jun. 23, 2005, pp. 1-3, IBM, USA.

Green, C.D., "Oracle 9i Database Performance Tuning Guide and Reference—Release 2 (9.2)", Oct. 2002, pp. 1-3, Oracle Corporation, United States.

International Search Report and Written Opinion dated Dec. 5, 2013 for International PCT Application No. PCT/EP2013/071813 from European Patent Office, p. 1-11, Rijswijk, Netherlands.

Swartz, K.L., "3PAR Fast RAID: High Performance Without Compromise", 2010, pp. 1-11, 3PAR Inc., United States.

U.S. Non-Final Office Action for U.S. Appl. No. 13/664,569 mailed Jul. 28, 2014.

U.S. Final Office Action for U.S. Appl. No. 13/664,569 mailed Jan. 28, 2015.

U.S. Notice of Allowance for U.S. Appl. No. 13/664,569 mailed Apr. 22, 2015.

\* cited by examiner

GENERALIZED STORAGE ALLOCATION FOR MULTIPLE ARCHITECTURES

BACKGROUND

Embodiments of the invention relate to storage allocation in storage systems, and in particular, generalized storage allocation for multiple storage architectures.

Many different types of storage system cluster architectures exist for storage of data. Some of these cluster architectures that may be used are storage area network (SAN), storage networking controller (SNC), Twin Tailed, Rack-Local SAN, SAN-SNC Hybrid, etc. Each of the different types of storage system architectures requires different types of storage allocation processes.

SUMMARY

Embodiments of the invention relate to storage allocation in a storage system. One embodiment comprises generating a request for storage space allocation in a particular storage device by a first node. An owner node associated with the particular storage device is determined by a first allocation client associated with the first node. The request is sent by the first allocation client to a second allocation client associated with the owner node. A storage device allocation region of the particular storage device is created, the allocation region comprising an area defined by a height proportional to storage devices the owner node and the second allocation client are coupled with, and a width that is inversely proportional to a number of nodes sharing the particular storage device.

Another embodiment comprises a storage system. The storage system comprises a plurality of storage devices. A first compute node generates a request for storage space allocation in a particular one of the plurality of storage devices. A first allocation client determines an owner node that owns the particular storage device, and sends the request for storage space to a second allocation client associated with the owner node. A storage allocation manager creates an allocation region in the particular storage device. The allocation region comprises an area defined by a height proportional to storage devices the owner node and the second allocation client are coupled with, and a width that is inversely proportional to a number of nodes sharing the particular storage device.

One embodiment comprises a non-transitory computer-useable storage medium for storage allocation in a storage system. The computer-useable storage medium has a computer-readable program. The program upon being processed on a computer causes the computer to implement: generating a request for storage space allocation in a particular storage device by a first node, determining an owner node associated with the particular storage device by a first allocation client associated with the first node, sending the request by the first allocation client to a second allocation client associated with the owner node, and creating a storage device allocation region of the particular storage device, the allocation region comprising an area defined by a height proportional to storage devices the owner node and the second allocation client are coupled with, and a width that is inversely proportional to a number of nodes sharing the particular storage device.

These and other features, aspects and advantages of the present invention will become understood with reference to the following description, appended claims and accompanying figures.

DETAILED DESCRIPTION

Figure 1:
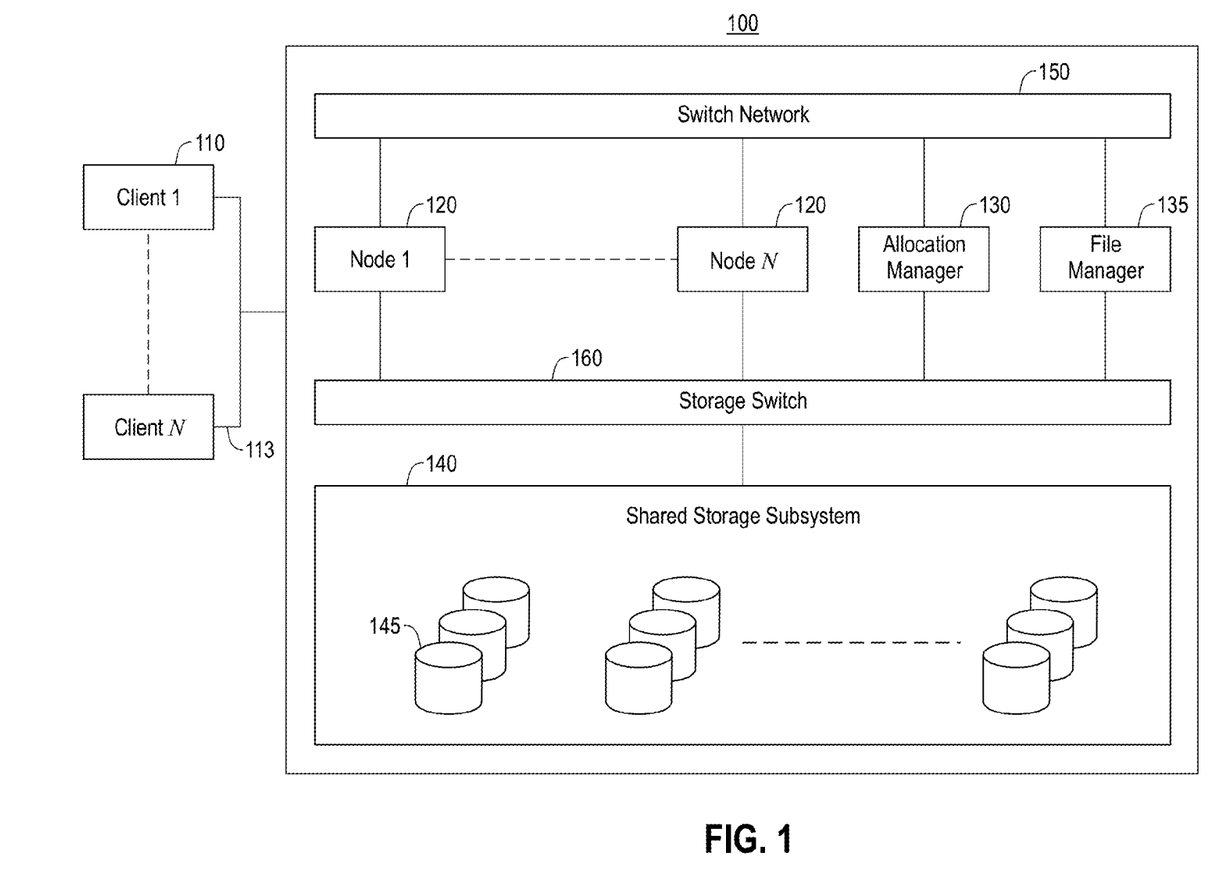
FIG. 1 illustrates a block diagram of a system utilizing generalized storage allocation, in accordance with an embodiment of the invention.

Referring now to the drawings, FIG. 1 shows an implementation of system 100 for generalized storage allocation. According to one embodiment of the invention, generalized storage allocation implemented by the system 100 comprises generating a request for storage space allocation in a particular storage device by a first node. An owner node that is associated with the particular storage device is determined by a first allocation client associated with the first node. The request is sent by the first allocation client to a second allocation client associated with the owner node. A storage device allocation region of the particular storage device is created. The allocation region comprises an area defined by a height proportional to storage devices the owner node and the second allocation client are coupled with, and a width that is inversely proportional to a number of nodes sharing the particular storage device. In one embodiment, only one owner node exists for the particular storage device.

In one embodiment, storage space allocation and free space management is adaptive for node-disk/storage device connectivity based on an allocation map layout. In one example, the allocation map layout includes divided disk regions based on a number of nodes that share a disk and a number of disks connected to a particular node. The embodiments provide a generalized storage allocation mechanism for different storage architectures spanning from shared-all to shared-nothing types of architectures. In one embodiment, system 100 includes allocation clients 1-N 110, nodes 1-N 120 (e.g., compute or application nodes), an allocation manager node 130, a file system manager 135, a shared storage subsystem 140 including multiple storage devices 145 (e.g., storage disk drives), a switch network 150 and a storage switch 160. In one example, the system 100 comprises a cluster file system that may have any desired type of storage architecture, such as SAN, SNC, Twin Tailed, Rack-Local SAN, SAN-SNC Hybrid, etc.

In an exemplary embodiment, the system 100 includes hardware architecture that can scale to a large number of nodes 120 1, 120 2 . . . 120 N and allocation clients, such as hundreds, thousands, etc. In one implementation, the file system manager 135 manages a file system(s) for system 100. For example, file systems of system 100 may include, but are not limited to, an IBM General Parallel File System™ (GPFS™), etc. In one embodiment, the file system manager 135 is embodied in software and may be run from any standalone node 120 in the system 100.

In one example, the shared storage subsystem 140 may include, but is not limited to, a storage area network (SAN) device. The shared storage subsystem 140 is coupled to a storage switch 160. The nodes 120 are coupled to the storage switch 160 for access to the shared storage subsystem 140. The file system manager 135 is coupled to the storage switch 160 for managing the file system of system 100 using the shared storage subsystem 140. The shared storage subsystem 140 is configured for providing nodes 120 with concurrent access to the same data. The shared storage subsystem 140 enables the sharing of write bandwidth across nodes 120. In one embodiment, the shared storage subsystem 140 may be designed to use underlying data protection techniques to circumvent hardware failures. For example, the shared storage subsystem 140 may use Redundant Array of Independent Disks (RAID) techniques to provide data protection.

In one example the switch network 150 is configured for providing interconnection for components within the file system. In one embodiment, the switch network 150 is configured for providing interconnection for the nodes 120 and the file system manager 135. In one example, the switch network 150 comprises a gigabit Ethernet switch for each node rack with a 1 gigabit per second (gbps) inter-switch link run with Linux software. In another embodiment, the switch network 150 is further configured for providing access to a client 110 over network 113. In one embodiment, communication over the network 113 may include communication over: the Internet, a local area network (LAN), a wide area network (WAN), via a telephone line using a modem (POTS), Bluetooth, WiFi, WiMAX, cellular, optical, satellite, RF, Ethernet, magnetic induction, coax, RS-485, the like or other like networks.

In one embodiment, the system 100 hosts data and computing services remotely for a client 110. For example, system 100 may enable cloud computing services for hosting data and compute services at a data site for remote clients. In one example, the system 100 is configured for hosting the running of data analytics applications and the storing of data associated for the data analytics applications remotely for clients 110 over the network 113. Accordingly, system 100 may enable parallelism and scalability in a cloud to run data intensive applications with large data sets. For example, data intensive applications include data analytics applications that decompose large compute tasks into a set of smaller parallelized computations.

In one embodiment, a first node 120 generates a request for storage space allocation in a particular storage device 145 of the shared storage subsystem 140. A first allocation client 110 that is associated (i.e., resides on the node, remotely connected to the node, etc.) with the first node 120 determines an owner node 120 that is considered the owner of the particular storage device 145, and sends the request for storage space allocation to a second allocation client 110 associated with the owner node 120. In one example, only one owner node 120 exists for the particular storage device 145. It should be noted that the first allocation client 110 and the second allocation client 110 are associated with the same node 120, then the first allocation client 110 and the second allocation client 110 are the same allocation client 110.

Figure 2:
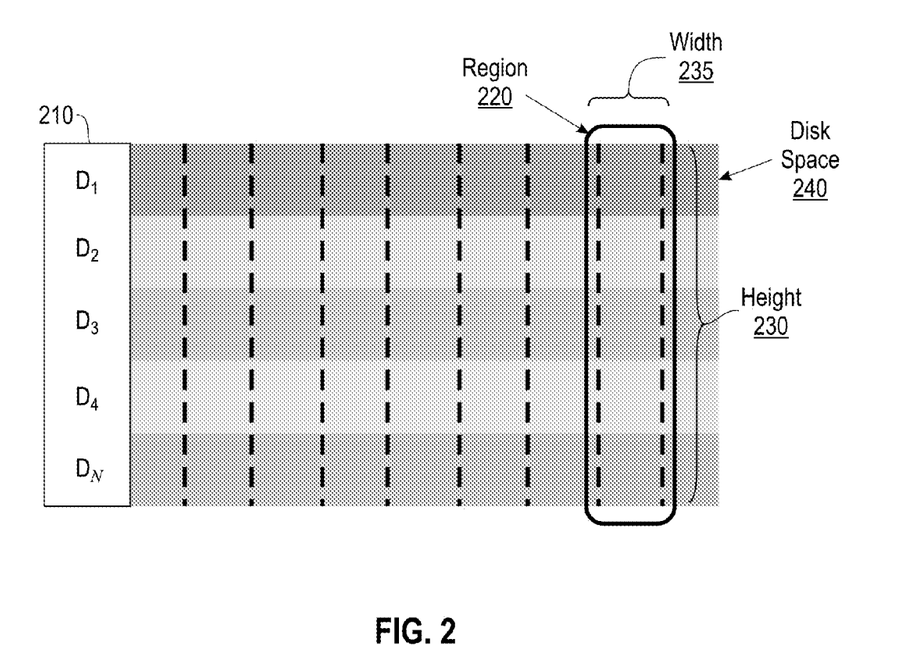
FIG. 2 illustrates a diagram of example storage devices and an allocation region, in accordance with an embodiment of the invention.

FIG. 2 shows an example allocation region 220 across a group 210 of storage devices 145 according to one embodiment. In one example, each storage device 145 in the group 210 includes disk space 240. In one example, the allocation region includes an area defined by a height 230 and a width 235 across the disk spaces 240 of the group 210. In one embodiment, the storage allocation manager 130 creates an allocation region 220 in the particular storage device 145. In one embodiment, the allocation manager 130 resides in a node 120 in the system 100.

In one example, the allocation region may be used for striping data to be stored in the system 100. In one embodiment, the allocation region 220 comprises a height proportional to the number of storage devices 145 that the owner node 120 and the second allocation client 110 are coupled with, and a width that is inversely proportional to a number of nodes 120 that share the particular storage device 145. In one example, the second allocation client 110 sends an ownership request for the allocation region 220 to the allocation manager 130, and the allocation manager 130 determines whether the allocation region 220 is available. In one embodiment, the allocation manager 130 sends an ownership status message to the second allocation client 110 informing whether the ownership request is granted or denied. Upon receiving an ownership granted message, the second allocation client 110 reserves the allocation region 220 and responds to the first allocation client 110 with the reserved allocation region.

In one embodiment, the storage allocation regions 220 for striping data to be stored in the file system of system 100 for a compute operation may be contiguous to a predetermined size. For example, the storage allocation regions 220 for striping data to be stored in the system 100 for a compute operation may be contiguous from, but not limited to, 8 MB to 256 MB. In other embodiments, the block size granularity for striping data to be stored in the system 100 for a compute operation may vary depending on the type of file system employed and application performance requirements.

In one example, the system 100 provides adaptive storage space allocation and free space management for node-disk connectivity using the allocation manager 130 based on an allocation map layout that includes divided disk regions based on a number of nodes 120 that share a storage device 145 and the number of storage devices that are connected to a particular node 120. In one example, the allocation manager 130 tracks a location of each allocation region 220 allocated to the storage devices 145 of the shared storage subsystem 140 for each node 120 in the system 100. In one embodiment, the allocation manager 130 uses the allocation map for tracking location of data allocated to the shared storage subsystem 140 for each node 120 in the system 100. In one embodiment, the file manager 135 provides each node 120 in the system 100 with access to the allocation map.

In one example, a node 120 uses the allocation map to determine a location of each region allocated to the shared storage subsystem 140. In one example, each allocation region 220 in the allocation map may contain the allocation status of l/n-th of the storage blocks on every storage device 145 in the system 100 and at any given point-in-time every node 120 has ownership of a particular storage device 145 with a region 220 and may satisfy all the allocation requests using the region 220. In one example, the allocation map layout allows the system 100 to allocate storage space properly striped across the shared storage subsystem 140 by accessing a single allocation region at a time.

Figure 3:
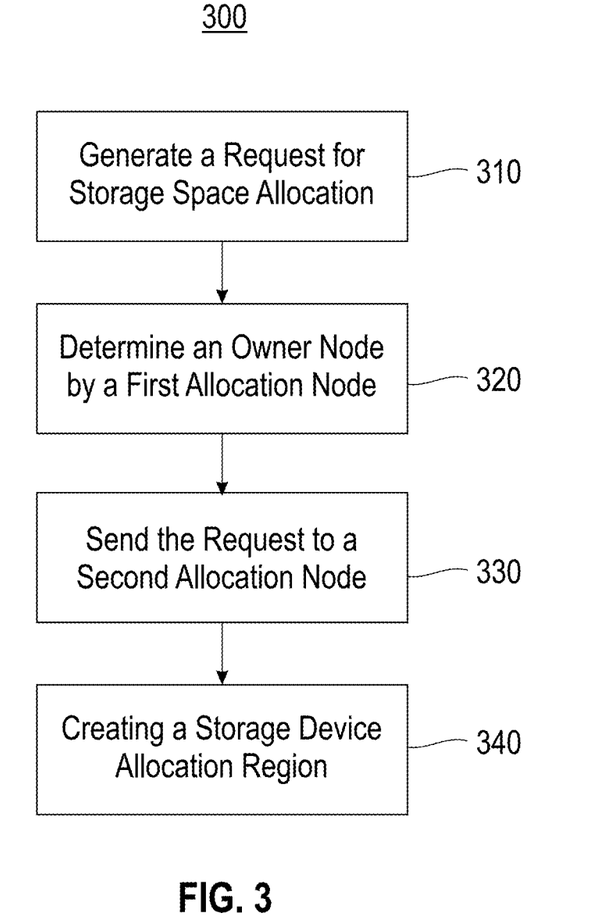
FIG. 3 illustrates a flowchart showing a process for generalized storage allocation in a storage system, in accordance with an embodiment of the invention.

FIG. 3 illustrates a flowchart of an example process for generalized storage region allocation 300 in a storage system (e.g., storage system 100) according to one embodiment. In process block 310, a request for storage space allocation in a particular storage device (e.g., a storage device 145) by a first node (e.g., 120) is generated. In process block 320, an owner node (e.g., a node 120) associated with the particular storage device by a first allocation client (e.g., an allocation client 110) associated with the first node. In process block 330, the request by the first allocation client is sent to a second allocation client (e.g., the first allocation client 110 or another allocation client 110) associated with the owner node. In process block 340, a storage device allocation region (e.g., allocation region 220) of the particular storage device is created. In one embodiment, the allocation region created comprises a height proportional to the storage devices the owner node and the second allocation client are coupled with, and a width that is inversely proportional to a number of nodes sharing the particular storage device.

In one example, the process 300 further includes sending an ownership request for the allocation region from the second allocation client to an allocation manager (e.g., allocation manager 130). In one example, process 300 includes determining whether the allocation region is available by the allocation manager, and sending an ownership status message to the second allocation client based on the determination. In one implementation, upon the allocation manager determining the allocation region is available, sending an ownership granted message to the second allocation client, and upon receiving the ownership granted message, the second allocation client reserves the allocation region. In one example, the second allocation client responds to the first allocation client with the reserved allocation region.

In one example, if the first node is determined to be the owner node in block 320, the first allocation client and the second allocation client are the same. In one implementation, only one owner node is associated with the particular storage device. In one example, the storage system is a cluster file system and the storage devices are disk devices. In one embodiment, the process 300, storage space allocation and free space management is adaptive for node-disk connectivity based on an allocation map layout, where the allocation map layout includes divided disk regions based on a number of nodes that share a disk and a number of disks connected to a particular node.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
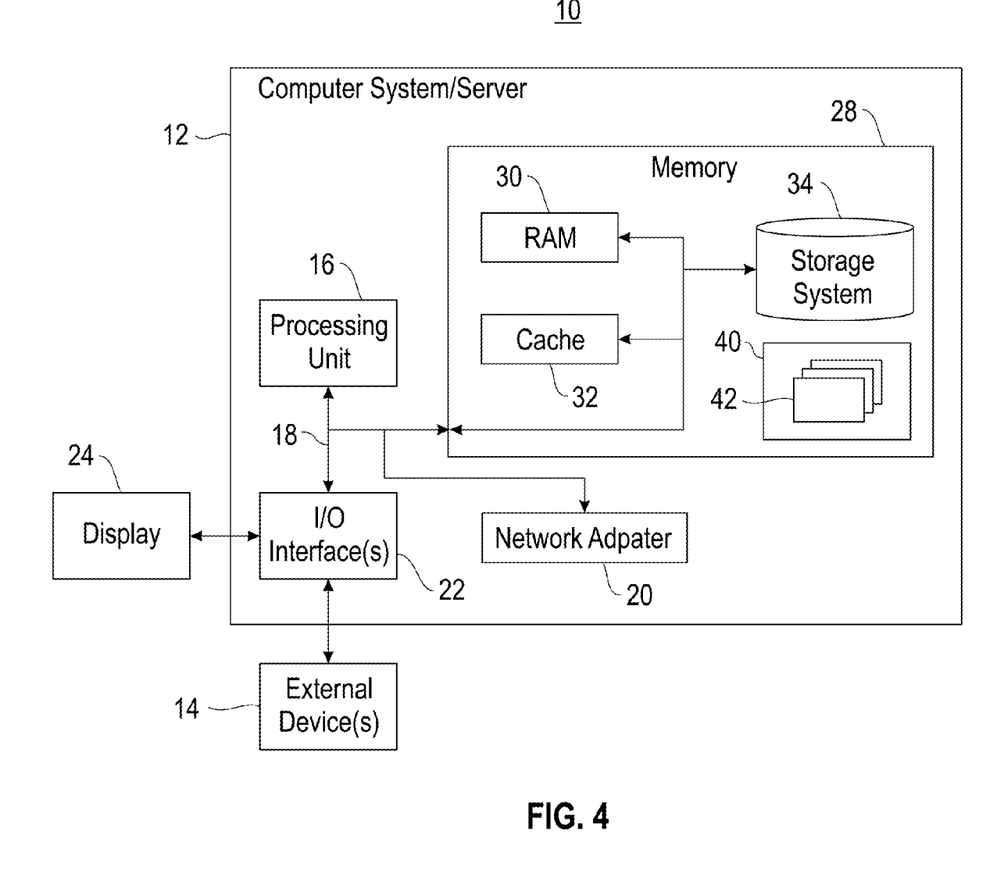
FIG. 4 depicts a cloud computing node, according to an embodiment of the present invention.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 5:
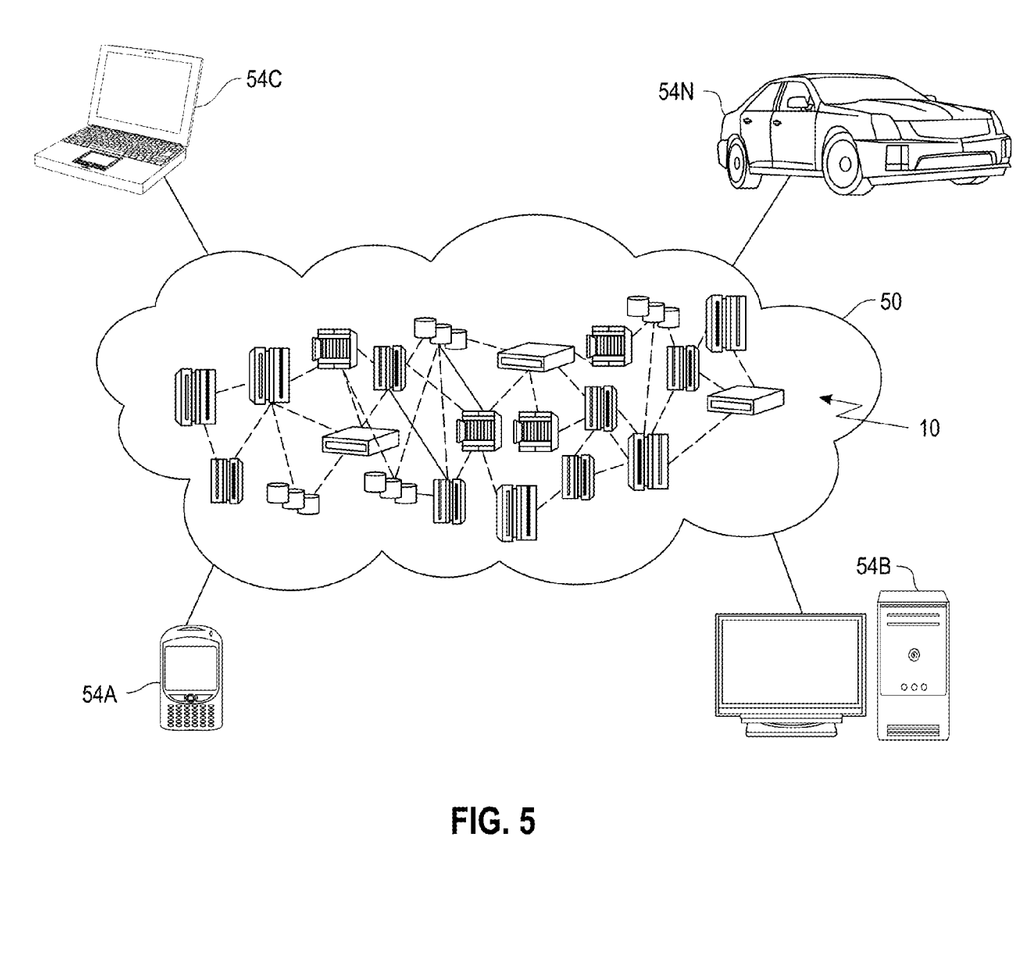
FIG. 5 depicts a cloud computing environment, according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
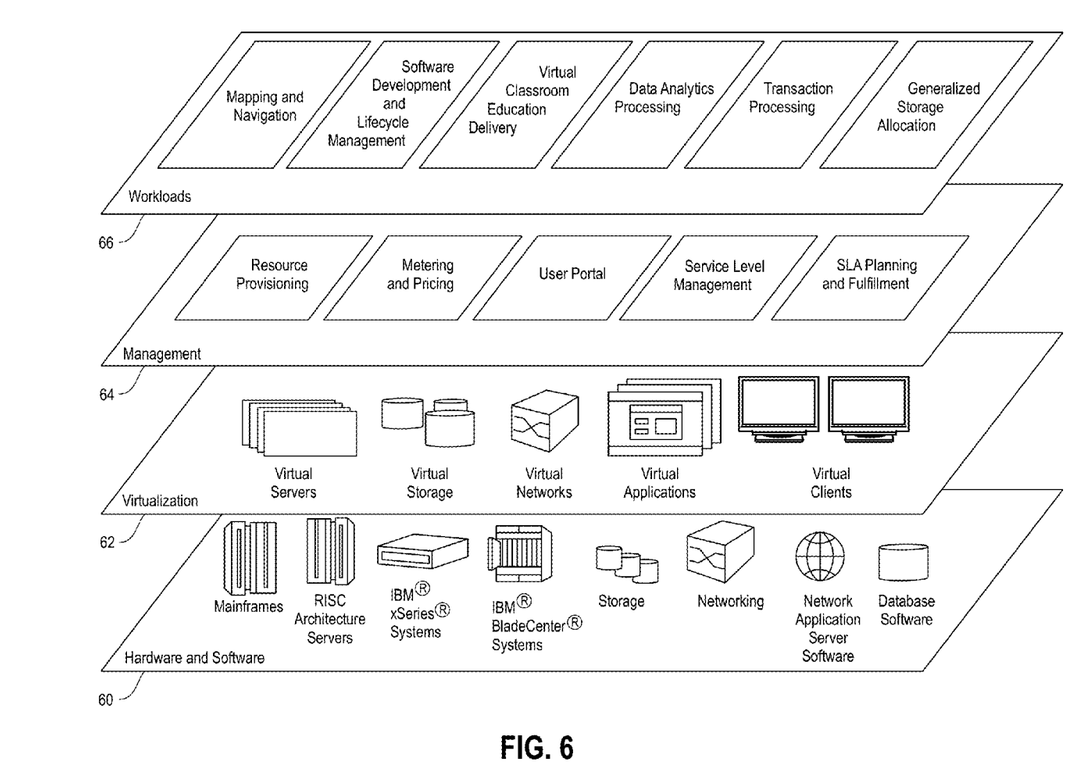
FIG. 6 depicts an abstraction model layers, according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and generalized storage allocation. As mentioned above, all of the foregoing examples described with respect to FIG. 6 are illustrative only, and the invention is not limited to these examples.

It is understood all functions of the present invention as described herein are typically performed by the generalized storage allocation system 100, which can be tangibly embodied as modules of program code 42 of program/utility 40 (FIG. 4). However, this need not be the case. Rather, the functionality recited herein could be carried out/implemented and/or enabled by any of the layers 60-66 shown in FIG. 6.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

The system 100 may include one or more source programs, executable programs (object code), scripts, or any other entity comprising a set of computer program instructions to be performed. When the system 100 includes a source program, then the program is usually translated via a compiler, assembler, interpreter, or the like, which may or may not be included within a storage device. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In one embodiment, where the system 100 is implemented in hardware, the system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for managing storage allocation comprising:
adaptively determining, by a storage device processor, a region height across disk spaces of a group of storage devices that is proportional to a number of connected storage devices; and
adaptively determining, by the storage device processor, a region width across the disk spaces for the group of storage devices that is inversely proportional to a number of nodes sharing a particular storage device.

2. The method of claim 1, further comprising:
creating an adaptive storage device allocation region of the particular storage device based on the determined region height across disk spaces of the group of storage devices, and the determined region width across the disk spaces for the group of storage devices.

3. The method of claim 1, further comprising:
generating a request for storage space allocation in the particular storage device by a first node, wherein the particular storage device is part of the group of storage devices;
determining an owner node associated with the particular storage device by a first allocation client associated with the first node; and
sending the request by the first allocation client to a second allocation client associated with the owner node.

4. The method of claim 3, wherein the number of storage devices the owner node and the second allocation client are connected to and the number of nodes sharing the particular storage device are adaptive.

5. The method of claim 3, further comprising:
determining whether the allocation region is available by an allocation manager; and
sending an ownership status message to the second allocation client based on the determination.

6. The method of claim 5, wherein upon the allocation manager determining the allocation region is available, the ownership status message sent informs the second allocation client that the ownership request is granted.

7. The method of claim 6, further comprising:
upon receiving the ownership status message informing that the ownership request is granted, the second allocation client reserves the allocation region; and
after the second allocation client reserves the allocation region, the second allocation client responding to the first allocation client with the reserved allocation region.

8. The method of claim 7, wherein only one owner node is associated with the particular storage device.

9. The method of claim 3, wherein the group of storage devices belong to a storage system that comprises a cluster file system, and the particular storage device comprises a storage disk.

10. The method of claim 9, wherein storage space allocation and free space management for the group of storage devices are adaptive for node-disk connectivity based on an allocation map layout.

11. The method of claim 10, wherein the allocation map layout is adaptive and includes divided disk regions for the group of storage devices based on a number of nodes that share a disk and a number of disks connected to a particular node, and the allocation map layout is used by an allocation manager for tracking location of data allocated to the storage devices for each node in the storage system.

12. An apparatus comprising:
a storage allocation processor that creates an adaptive allocation region in a particular storage device based on the storage allocation processor being configured to adaptively determine a region height across disk spaces of a group of storage devices that is proportional to a number of connected storage devices, and that is configured to adaptively determine a region width across the disk spaces of the group of storage devices that is inversely proportional to the a number of nodes sharing the particular storage device.

13. The apparatus of claim 12, wherein the group of storage devices belong to a storage system, the storage system comprises a cluster file system, and the particular storage device comprises a storage disk.

14. The apparatus of claim 13, wherein the storage allocation processor provides adaptive storage space allocation and free space management for node-disk connectivity based on an allocation map layout.

15. The apparatus of claim 14, wherein the allocation map layout includes divided disk regions based on a number of nodes that share a disk and a number of disks connected to a particular node.

16. The apparatus of claim 15, wherein the storage allocation processor is configured to track location of data allocated to the storage devices for each node in the storage system based on the allocation map layout.

17. A non-transitory computer program product for storage allocation in a shared storage system, the computer program product comprising a computer readable storage medium having program instructions embodied therewith, the program instructions executable by a processor to cause the processor to:

adaptively determine, by the processor, a region height across disk spaces of a group of storage devices that is proportional to a number of connected storage devices; and adaptively determine, by the processor, a region width across the disk spaces for the group of storage devices that is inversely proportional to a number of nodes sharing a particular storage device.

18. The non-transitory computer program product of claim 17, further causing the processor to:
generate, by the processor, a request for storage space allocation in the particular storage device by a first node, wherein the particular storage device is part of the group of storage devices;
determine, by the processor, an owner node associated with the particular storage device by a first allocation client associated with the first node;
send, by the processor, the request by the first allocation client to a second allocation client associated with the owner node; and
create, by the processor, an adaptive storage device allocation region of the particular storage device based on the determined region height across disk spaces of the group of storage devices, and the determined region width across the disk spaces for the group of storage devices.

19. The non-transitory computer program product of claim 18, wherein:
the shared storage system comprises a cluster file system;
the particular storage device comprises a storage disk;
the number of storage devices the owner node and the second allocation client are connected to and the number of nodes sharing the particular storage device are adaptive; and
storage space allocation and free space management for the group of storage devices are adaptive for node-disk connectivity based on an allocation map layout.

20. The non-transitory computer program product of claim 19, wherein:
the allocation map layout is adaptive and includes divided disk regions for the group of storage devices based on a number of nodes that share a disk and a number of disks connected to a particular node; and
the allocation map layout is used by the processor to track location of data allocated to the storage devices for each node in the shared storage system.

* * * * *